United States Patent [19]
Camberlin et al.

[11] Patent Number: 6,015,859
[45] Date of Patent: Jan. 18, 2000

[54] THERMOPLASTIC POLYMER MIXTURE WITH IMPROVED MECHANICAL PROPERTIES

[75] Inventors: Yves Camberlin, Caluire; Serge Gonzalez, Decines; Frédérique Hauviller, Saint Genis Laval, all of France

[73] Assignee: Institut Francais du Petrole, Rueil Malmaison, France

[21] Appl. No.: 09/045,720

[22] Filed: Mar. 23, 1998

[30] Foreign Application Priority Data

Mar. 24, 1997 [FR] France ................... 97 03555

[51] Int. Cl.[7] ............ C08L 63/00; C08L 23/00; C08L 23/36
[52] U.S. Cl. ................ 525/112; 525/57; 525/64; 525/66; 525/65; 525/67; 525/73; 525/108; 525/111; 525/113; 525/205; 525/282
[58] Field of Search ................ 525/57, 64, 65, 525/66, 67, 73, 205, 282, 108, 111, 112, 113

[56] References Cited

U.S. PATENT DOCUMENTS

| | | | |
|---|---|---|---|
| 4,632,962 | 12/1986 | Gallucci | 525/282 |
| 5,466,753 | 11/1995 | Marczinke et al. | 525/193 |
| 5,552,480 | 9/1996 | Sugita | 525/67 |
| 5,594,062 | 1/1997 | Takemura | 525/67 |

FOREIGN PATENT DOCUMENTS

| | | |
|---|---|---|
| 0 337 814 | 10/1989 | European Pat. Off. |
| 43 42 605 | 6/1995 | Germany |

OTHER PUBLICATIONS

Abstract, Section Ch, Week 9618 (AN–96–175787), Derwent Publications Ltd., London, GB, Feb. 27, 1996.

*Primary Examiner*—David Buttner
*Attorney, Agent, or Firm*—Millen, White, Zelano & Branigan, P.C.

[57] ABSTRACT

A thermoplastic polymer composition contains at least two distinct polymers, characterized in that it comprises at least one polymer P1 containing at least one reactive function and at least one modified polyolefin P2 containing at least one succinimide ring substituted on the nitrogen by a reactive group, the ring being carried either by the main chain or by a side chain, and optionally at least one third polymer P3 selected from the group formed by polymers and copolymers obtained by polymerisation of one or more olefinic compounds. A mixture of polymers comprises at least one composition as defined above and at least one other polymer P5 which is identical to or different from polymer P3 and optionally at least one other polymer P6 which is identical to or different from polymer P1.

25 Claims, No Drawings

6,015,859

THERMOPLASTIC POLYMER MIXTURE WITH IMPROVED MECHANICAL PROPERTIES

BACKGROUND OF THE INVENTION

The invention relates to a polymer composition constituted by a modified polymer and a polymer containing at least one reactive function, for the production of tubes or receptacles which have improved mechanical properties using conventional manufacturing equipment.

The invention also relates to polymer mixtures containing a composition of the invention as a compatibilising agent for incompatible polymers.

The prior art, see for example United States patent U.S. Pat. No. 3,373,222 describes polymer compositions containing a polyolefin and a polyamide, which in the presence of a copolymer based on ethylene and acrylic or methacrylic acid have mechanical properties which are superior to those of polyethylene-polyamide mixtures prepared in the absence of an ethylene-acrylic (or methacrylic) acid copolymer. Extrusion or extrusion blow moulding processing methods are used for such compositions.

European patent EP-A-0 015 556 describes a process for the production of objects with a lamellar structure dispersed with compositions containing a polyolefin, a second polyamide type polymer which is incompatible with the polyolefin and an ethylene copolymer containing acid, anhydride or ester groups either in the main chain or as grafts (pendent chains). In that case, the mixture is described as being heterogeneous, with a continuous polyolefinic phase and a dispersed polyamide phase in the form of lamellae oriented in the plane of the wall of the object. Such orientation is obtained by substantial stretching (100% to 500%) of the hot polymer phase in two spatial directions followed by quenching. The thickness of the polyamide lamellae obtained is in the range 0.5 to $50 \times 10^{-6}$ meters (see in particular EP-A-0 095 349 and EP-A-0 090 554).

In such a composition type, the agent used to improve the mechanical properties of the mixture obtained is generally a copolymer of ethylene and a fumaric or adipic acid type organic acid (see in particular EP-A-0 095 349, EP-A-0 090 554 and EP-A-0 015 556), also acrylic acid or maleic anhydride (see in particular U.S. Pat. Nos. 3,373,222, 3,373,223, 3,373,224 and 4,444,817).

Polyamide compositions associated with copolymers or terpolymers based on ethylene, an acrylic or methacrylic ester and acrylic or methacrylic acid or maleic anhydride are also known. The presence of copolymers or terpolymers dispersed in a nodular form in a continuous polyamide phase confers on the latter an improved impact strength (see in particular German patent document DE A-2 551 023).

The above references, which represent the current state of the art in the field of thermoplastic resin alloys in general and polyethylene-polyamide mixtures in particular, have led to the interest in using copolymers, i.e., polymers composed of two different monomers, as agents which encourage adhesion between two phases constituted by two incompatible polymers. We have now, surprisingly, discovered that incorporating certain modified polymers into compositions and/or mixtures of incompatible polymers can result in a substantial improvement in physico-chemical and mechanical properties of the composition obtained when compared with binary mixtures.

SUMMARY OF THE INVENTION

The compositions of the invention can generally be defined as thermoplastic polymer compositions containing at least two distinct polymers, i.e., at least one polymer P1 containing at least one reactive function and at least one modified polyolefin P2 containing at least one succinimide ring substituted on the nitrogen by a reactive group, the ring being carried either by the main chain or by a side chain.

Particular compositions of the invention will comprise at least one third polymer P3 selected from the group formed by polymers and copolymers obtained by polymerisation of one or more olefinic compounds. In a preferred embodiment, the third polymer is a polyolefin. This polyolefin is normally selected from the group formed by polyolefins obtained from at least one unsaturated monomer selected from the group formed by compounds containing one or more unsaturated bonds, preferably selected from the group formed by ethylene, propene, butenes and norbornenes. Of these polyolefins, the following can be cited: polyethylenes, polypropylenes, polybutylenes and copolymers of these compounds. Usually, polyethylenes or ethylene copolymers constituted by at least 90% of ethylene and at most 10% of a C3 to C8 olefin are used. In particular, polyethylene known as high density polyethylene is used, preferably with a density of about 0.9 to about 0.97 and a melt index, measured in accordance with ASTM D 1238, of about 0.2 to about 100 (measurements carried out at 19.6 kg at 190° C.).

Polymer P1 containing at least one reactive function is normally a polymer selected from the group formed by polyesters, liquid crystal polymers, polycarbonates, polyamides, copolyamides, polyurethanes, polyacetals, polyvinyl alcohols, ethylene-vinyl alcohol copolymers, and copolymers of olefins and functionalised vinyl derivatives, such as ethylene-acrylic acid copolymers. The polymer containing a reactive function is often a polyester or polyamide, preferably a polyester. Suitable polyesters for use in the present invention are homopolyesters and copolyesters. These polyesters are normally obtained by polycondensation of at least one compound containing at least two carboxylic acid functions with at least one compound comprising two hydroxyl functions, or by polycondensation of at least one compound containing at least one hydroxyl function and at least one carboxylic acid function, or by polycondensation of at least one compound of each of these categories. Non limiting examples of diacids which can be used to form the polyesters are terephthalic acid, isophthalic acid, naphthalenedicarboxylic acids, diphenyldicarboxylic acids, diphenyletherdicarboxylic acids, diphenyletherdicarboxylic acids, diphenylethanedicarboxylic acids, cyclohexanedicarboxylic acids, adipic acid, suberic acid, sebacic acid, azelaic acid, malonic acid, glutaric acid and pimelic acid, each of these acids possibly containing alkyl, alkoxy or halogen substituents. Non limiting examples of dihydroxyl compounds for forming polyesters are ethylene glycol, propylene glycols, butane diols, neopentyl glycol, hydroquinone, resorcinol, naphthalene diols, dihydroxydiphenylethers, cyclohexane diols, bishydroxyphenyl alkanes, among them 2,2-bis(4-hydroxyphenyl-propane (bis-phenol-A), polyoxyalkylene glycols and derivatives of these compounds substituted with one or more alkyl, alkoxy or halogen groups. Non limiting examples of hydroxycarboxylic compounds which are suitable for forming polyesters are hydroxybenzoic acids, hydroxynaphthoic acids, and derivatives of these compounds substituted with one or more alkyl, alkoxy or halogen groups. Preferred polyesters are polyesters containing ester functions bonded to an aromatic ring, in particular polybutylene terephthalate. Examples of polyamides and copolyamides which are used in the present invention are those which can be cited which are obtained by known reactions of a diacid with a diamine or an amino acid or a lactame with itself. Examples of carboxylic acids are terephthalic acid, isophthalic acid, naphthalenedicarboxylic acids, diphenyldicarboxylic acids, diphenyletherdicarboxylic acids, diphenylethanedicarboxylic acids, cyclohexanedicarboxylic acids, adipic acid, suberic acid, sebacic acid, azelaic acid, malonic acid, glutaric acid and pimelic acid. Examples of primary amines are tetramethylene-diamine, pentamethylene-diamine, hexamethylene-diamine, and octamethylene-diamine. Examples of lactames and amino acids are caprolactame (to form polyamide 6) and amino-undecanoic acid (to form polyamide 11). Particular examples of polyamides are polyamides 4 and 12 and polyamides 6-6, 5-6, 4-10, 5-10 and 6-10. Polyamides 6 and 11 are preferred.

The modified polyolefin used in the compositions of the present invention can be defined as being the product of the reaction of at least one polyolefin, at least one compound containing a maleimide ring substituted on the nitrogen by a reactive group with formula —R—(X)$_n$, where X represents a reactive group, n is a positive whole number equal to 1 or more and R is a residue containing at least one carbon atom, and at least one polyepoxide containing at least two epoxy groups in its molecule. n is usually 1 and in this case, the compound containing a maleimide ring used in the present invention is represented by formula (I) below:

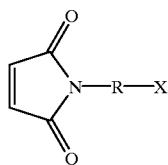

The reactive group —X is normally selected from the group formed by hydroxyl, a carboxylic group, a carboxamide group, a carboxylic acid halide group, a thiol group, a thiocarboxylic group, an amino group, a halogen, an epoxy group, and an esterified carboxylic group in which the ester portion contains a reactive group. When several groups —X are present, they may be identical to or different from each other.

Usually, compounds are used which contain a reactive group selected from the carboxylic group, the carboxamide group, and an acid halide group, for example a carboxylic acid halide group. The carboxylic group is preferred.

Group —R— is normally selected from aliphatic, saturated or unsaturated, substituted or non substituted hydrocarbons groups, and substituted or non substituted aromatic groups. In general, non substituted groups are preferred, usually groups containing at least one aromatic ring. Examples of frequently used groups are benzene rings, which are ortho-, meta- or para-bonded to a nitrogen atom and to a reactive group —X. The para- or meta- form is usually used.

The polyolefins used to manufacture the modified polyolefins used in the present invention can be any polyolefins which are known to the skilled person. Preferably, polyolefins obtained from at least one unsaturated monomer containing one or more unsaturated bonds is used, usually selected from the group formed by ethylene, propene, butenes and norbornenes. Thus these polyolefins can be formed by homopolymerisation or by copolymerisation of at least two monomers.

In a particularly preferred form, the polyolefin is selected from the group formed by high density polyethylenes and copolymers of ethylene preferably constituted by at least 90% of ethylene and at most 10% of a C3 to C8 olefin. More particularly, high density polyethylenes which preferably have a density of about 0.90 to about 0.97 and a melt index (measured using ASTM D-1238) of about 0.2 to about 100 (measured at 19.6 kg at 190° C.) are used.

The polyepoxide containing at least two epoxy groups in its molecule is usually selected from the group formed by aliphatic polyepoxides, cycloaliphatic polyepoxides and aromatic polyepoxides. Examples of compounds which are usually used are the diglycidylether of bis-phenol-A or that of bis-phenol-F, triglycidylether isocyanurate and/or triglycidylether cyanurate and/or triglycidyl cyanurate and/or triglycidyl isocyanurate or mixtures of at least two of these compounds. The epoxy compounds containing at least two epoxy groups cited in U.S. Pat. No. 4,921,047 can also be used in the present invention. The disclosure of that patent is considered to form an integral part of the present invention by dint of this reference thereto. Polyepoxides substituted with halogen atoms can also be used, in particular those substituted with chlorine and/or bromine.

The modified polyolefins used in the present invention are normally prepared by two distinct methods. The first method consists of bringing the molten polyolefin into contact with at least one compound containing a maleimide ring substituted on the nitrogen by a reactive group and at least one compound containing at least two epoxy groups in its molecule in a mixer or an extruder to form a product P4 which corresponds to the modified olefin which is used to produce the compositions of the present invention. This preparation can be carried out with or without a radical initiator. Examples of radical initiators are peroxides. In the present invention, it is normally preferable to operate without a radical initiator. This possibility of forming polymers containing a succinimide ring substituted on the nitrogen by a reactive group, the ring being carried either by the main chain or by a side chain, without the use of a radical initiator, is a distinct advantage which avoids the risks of cleavage and cross-linking of the polymer. The reaction temperature is normally in the range from about the melting point of the polyolefin to about 300° C. The temperature is usually about 200° C. to about 260° C. The reaction time is relatively short and normally does not exceed 10 minutes. An extrusion reaction system is usually preferred, which system produces good results.

The second method for preparing modified polyolefins (product P4) used in the present invention consists, in a step a1), in bringing the molten polyolefin into contact with at least one compound containing a maleimide ring substituted on the nitrogen by a reactive group in a mixer or an extruder then, in a step a2), introducing at least one compound containing at least two epoxy groups in its molecule into the mixer or extruder. This preparation can be carried out with or without a radical initiator. Examples of radical initiators are peroxides. In the present invention, it is normally preferable to operate without a radical initiator. This possibility of forming polymers containing a succinimide ring substituted on the nitrogen by a reactive group, the ring being carried either by the main chain or by a side chain, without the use of a radical initiator, is a distinct advantage which avoids the risks of cleaving and cross-linking of the polymer. The reaction temperature in step a1), as in step a2), is normally in the range from about the melting point of the polyolefin to about 300° C. The temperature is normally about 200° C. to about 260° C. The reaction time is relatively short and usually does not exceed 10 minutes for each step. An extrusion reaction system is usually preferred, which system produces good results. The temperature is usually identical in the two steps.

The compositions of the present invention can thus be prepared using two distinct methods. The first method consists of bringing a molten polyolefin containing at least one reactive group into contact with at least one compound containing a maleimide ring substituted on the nitrogen by a reactive group and with at least one polyepoxide containing at least two epoxy groups in its molecule, in a mixer or an extruder. The contact temperature is normally in the range from about the melting point of the polymer in the composition with the highest melting point to about 300° C. The temperature is normally about 200° C. to about 260° C. The reaction time is relatively short and normally does not exceed 10 minutes. An extrusion reaction system is usually preferred, which system produces good results.

The second method consists of bringing product P4 into contact with at least one polymer containing a reactive function as defined above in a mixer or an extruder. The contact temperature is normally in the range from about the melting point of product P4 or the polymer with the highest melting point to about 300° C. The temperature is normally about 200° C. to about 260° C. The reaction time is relatively short and normally does not exceed 10 minutes. An extrusion reaction system is usually preferred, which system produces good results.

The present invention also provides mixtures of polymers comprising at least one of the compositions described above and at least one polymer P5, identical to or different from polymer P3, normally selected from the group formed by polymers and copolymers obtained by polymerisation of one or more olefinic compounds. In a preferred embodiment of the invention, polymer P5 is a polyolefin which is normally selected from the polyolefins cited above. As an example, a polyolefin is used which is selected from the group formed by polyolefins obtained from at least one unsaturated monomer selected from the group formed by compounds containing one or more unsaturated bonds, preferably selected from the group formed by ethylene, propene, butenes and norbornenes. Most advantageously, a high density polyolefin selected from those cited above is used.

The present invention also provides mixtures of polymers comprising at least one of the compositions described above and at least one polymer P6, which is identical to or different from polymer P1, containing at least one reactive function normally selected from the polymers containing a reactive function cited above. In a preferred embodiment of the invention, polymer P6 is selected from the group formed by polyesters, liquid crystal polymers, polycarbonates, polyamides, polyacetals, polyvinyl alcohols, ethylene-polyvinyl alcohol copolymers, and copolymers of olefins and functionalised vinyl derivatives. A polymer P6 selected from the group formed by polyesters and polyamides such as one of those mentioned above is usually used. In a particularly preferred embodiment, a polyester is used.

The present invention also provides mixtures of polymers comprising at least one of the compositions described above, at least one polymer P5, identical to or different from polymer P3, and at least one polymer P6, identical to or different from polymer P1.

The proportion of modified polyolefin P2 in the compositions or mixtures of the invention is normally about 0.01% to about 99% by weight. This proportion is usually about 0.1% to about 90% by weight and more usually about 0.2% to about 75% by weight. For compositions containing only polymers P1 and P2, the quantity of P1 is the complement to 100% by weight with respect to the quantity of P2 used. When the composition (or mixtures) also comprises at least one other polymer P3 or at least two other polymers P3 and P5, the quantity of this polymer P3 or the sum of polymers P3 and P5 is normally about 1% to about 95% by weight, usually about 5% to about 90% by weight, and the quantity of polymer P1 is about 1% to 75% and usually about 5% to about 60%. When the composition (or mixtures) also comprise at least one other polymer P6, the quantity of this polymer P6 or the sum of polymers P1 and P6 is normally about 1% to about 75% by weight and usually about 5% to about 60%. When the composition (or mixtures) also comprise at least one other polymer P3 and at least two other polymers P5 and P6, the quantity of this polymer P3 or the sum of polymers P3 and P5 is normally about 1% to about 95% by weight and usually about 5% to about 90% by weight and the quantity of this polymer P6 or the sum of polymers P1 and P6 is normally about 1% to about 75% by weight, usually about 5% to about 60%. In all cases, the sum of the quantities of polymers present in the composition or in the mixtures of the invention equals 100% by weight.

The complete description of all applications, patents and publication cited above and below and the corresponding French application number 97/03555 filed on Mar. 24, 1997 is incorporated in the present description by reference.

The following examples illustrate the invention without limiting its scope.

EXAMPLE 1

This example describes the preparation of a polymer composition of the invention using a co-rotating twin screw CLEXTRAL extruder, reference BC21, with a length to diameter ratio of 28. The diameter of the screws was 25 millimetres (mm) and the extruder was provided with a 4 mm diameter die.

A barrel-formed mixture of granules composed of 70 per cent (%) by weight of polyethylene (PE) sold by FINA under trade name FINATHENE 3802® and 30% by weight of polybutylene terephthalate (PBT) sold by GENERAL ELECTRIC PLASTICS under trade name VALOX 325® was introduced into the feed hopper. The granules were introduced into the extruder at a rate of 5 kilograms per hour (kg/h).

A K-TRON powder dispenser, trade name KM-T20®, was used to simultaneously introduce into the machine's feed hopper an equimolar mixture of maleimidobenzoic acid (MBA) and ARALDITE GT 7071®, sold by CIBA-GEIGY, with an epoxy index of 2. The powder flow rate was 0.2 kg/h.

The total flow rate of the products introduced into the extruder was 5.2 kg/h. The temperature in the extruder was held at 240° C., the screw rotation speed was 100 rotations per minute (rpm) and the residence time was 1 minute. The rod which left the die was water cooled at 25° C. It was granulated and dried.

EXAMPLE 2

This is a comparative example in which a mixture of PE and PBT was prepared. The procedure described in Example 1 was followed but only a mixture of PE granules (70% by weight) and PBT granules (30% by weight) was introduced into the extruder. The operating temperature was 240° C. The granule flow rate was 5 kg/h and the screw speed was 100 rpm. The rod which left the die was water cooled at 25° C. It was granulated and dried.

EXAMPLE 3

This example describes the preparation of a mixture of polymers of the invention. The procedure described in Example 1 was followed but a barrel-formed mixture of granules composed of 64% by weight of PE, 27% by weight of PBT and 9% by weight of the composition prepared in Example 1 was introduced into the extruder. The operating temperature was 240° C. The granule flow rate was 5 kg/h and the screw speed was 100 rpm. The rod which left the die was water cooled at 25° C. It was granulated and dried.

EXAMPLE 4

This example describes the preparation of a mixture of polymers of the invention. The procedure described in Example 1 was followed but a barrel-formed mixture of granules composed of 64% by weight of PE, 27% by weight of PBT and 9% by weight of the composition prepared in Example 3 was introduced into the extruder. The operating temperature was 240° C. The granule flow rate was 5 kg/h and the screw speed was 100 rpm. The rod which left the die was water cooled at 25° C. It was granulated and dried.

EXAMPLE 5

This example describes the preparation of a modified polyolefin (product P2) for use in preparing compositions of the invention. The procedure described in Example 1 was followed but a mixture of PE and a powder comprising an equimolar mixture of AMB and ARALDITE GT 7071® was introduced into the extruder. The flow rate of the products introduced into the extruder was 5.28 kg/h, namely 5 kg/h of PE and 0.28 kg/h of the AMB-ARALDITE® mixture and the screw speed was 100 rpm. The rod which left the die was water cooled at 25° C. It was granulated and dried.

EXAMPLE 6

This example describes the preparation of a polymer composition of the invention. The procedure described in Example 1 was followed but a barrel-formed mixture of granules composed of 60% by weight of PE, 30% by weight of Polyamide 6 (PA6) sold by ELF ATOCHEM under trade name ORGAMIDE RESNO® with a number average molecular mass of 31200 grams per mole, and 10% by weight of product P2 prepared as in Example 5 was introduced into the extruder. The operating temperature was 240° C. The granule flow rate was 5 kg/h and the screw speed was 100 rpm. The rod which left the die was water cooled at 25° C. It was granulated and dried.

EXAMPLE 7

This is a comparative example in which a mixture of PE and PA6 was prepared. The procedure described in Example 1 was followed but only a mixture of PE granules (70% by weight) and PA6 granules (30% by weight) was introduced into the extruder. The operating temperature was 240° C. The granule flow rate was 5 kg/h and the screw speed was 100 rpm. The rod which left the die was water cooled at 25° C. It was granulated and dried.

EXAMPLE 8

This example describes the preparation of a mixture of polymers of the invention. The procedure described in Example 1 was followed but a barrel-formed mixture of granules composed of 65% by weight of PE, 28% by weight of PA6 and 7% by weight of the product prepared in Example 6 was introduced into the extruder. The operating temperature was 240° C. The granule flow rate was 5 kg/h and the screw speed was 100 rpm. The rod which left the die was water cooled at 25° C. It was granulated and dried.

EXAMPLE 9

In this example, samples were prepared from the various compositions or mixtures obtained from the above examples which were used to determine the mechanical properties of these polymer mixtures or compositions. The samples were produced using a BILLION type injection moulding machine with a closing pressure of 900 kilonewtons provided with a 38 mm diameter screw. The "two cavity" die was kept at a temperature of 20° C. Type A samples satisfied ISO standard 3167. Table 1 below shows the sample formation conditions.

TABLE 1

| Example n° | Material temperature (° C.) | Commutation pressure (bar*) | Screw speed (rpm) |
|---|---|---|---|
| 1 | 237 | 120 | 150 |
| 2 | 238 | 120 | 150 |
| 3 | 236 | 120 | 150 |
| 4 | 237 | 120 | 150 |
| 6 | 243 | 141 | 80 |
| 7 | 244 | 126 | 80 |
| 8 | 244 | 130 | 80 |

*1 bar equals 0.1 MPa.

EXAMPLE 10

In this example the impact strength of certain of the samples produced in Example 9 was determined. The test was carried out using the CHARPY SHOCK test using ISO standard 179/1eA. The pendulum energy was 4 joules, the inter support distance was 62 mm, measurements were carried out at 23° C. and 50% relative humidity. The values are shown in Table 2 below:

TABLE 2

| Example n° | Energy (J) | Strength (kJ/m$^2$) |
|---|---|---|
| 2 | 0.3 | 9.99 |
| 3 | 0.34 | 11.03 |
| 4 | 0.31 | 10.33 |
| 7 | 0.98 | 32 |
| 8 | 1.2 | 40.03 |

The results show that the compositions or mixtures of the invention have a better impact strength than the comparative polymer mixtures (samples obtained from the products prepared in Examples 2 and 7).

EXAMPLE 11

In this example, the ultimate tensile strength of certain of the samples produced in Example 9 was tested. A traction test was carried out using an INSTRON 1175 type machine provided with a $10^5$ Newton measuring head. The elastic modulus is given for a crossbeam rate of displacement of 1 mm/min. The other values are given for a crossbeam rate of displacement of 10 mm/min. The measured values are shown in Table 3 below.

TABLE 3

| Example n° | Elastic modulus (MPa) | Breaking stress (MPa) | Break strain (%) |
|---|---|---|---|
| 1 | 746 | 12.5 | 55 |
| 2 | 651 | 11 | 54 |
| 3 | 673 | 11.1 | 65 |
| 4 | 651 | 12 | 59 |
| 6 | 681 | 23.4 | 61.1 |
| 7 | 680 | 21.6 | 18.4 |
| 8 | 686 | 23.4 | 26.1 |

The results show that the compositions or mixtures of the invention have better mechanical properties than the comparative polymer mixtures (samples obtained from the products prepared in Examples 2 and 7).

The above examples could be repeated to obtain analogous results by substituting the reactants and/or general or particular conditions described in the text for those used in these examples.

In view of the above description, the skilled person can readily determine the essential characteristics of the invention and could make a variety of changes or modifications to adapt it to different uses and conditions without departing from the spirit and scope of the invention.

We claim:

1. A thermoplastic polymer composition containing at least two distinct polymers, comprising at least one polymer P1 containing at least one reactive function and a least one modified polyolefin P2 containing at least one succinimide ring substituted on the nitrogen by a reactive group, wherein the modified polyolefin is the product of the reaction of at least one polyolefin, at least one compound containing a maleimide ring substituted on the nitrogen by a reactive group with formula OR—(X)$_n$, where X represents a reactive group, n is a positive whole number equal to 1 or more and R is a residue containing at least one carbon atom, and at least one polyepoxide containing at least two epoxy groups in its molecule.

2. A thermoplastic polymer composition according to claim 1, comprising at least one third polymer selected from the group consisting of polymers and copolymers obtained by polymerisation of one or more olefinic compounds.

3. A thermoplastic polymer composition according to claim 2, in which the third polymer is a polyolefin.

4. A mixture of polymers, characterized in that it comprises at least one composition according to claim 2, and at least one polymer P5, identical to or different from polymer P3, selected from the group consisting of polymers and copolymers obtained by polymerisation of one or more olefinic compounds.

5. A mixture according to claim 4, in which polymer P5 is a polyolefin.

6. A mixture according to claim 4, in which the polyolefin is a high density polyolefin.

7. A mixture according to any claim 4, characterized in that it further comprises at least one polymer P6, identical to or different from polymer P1, containing at least one reactive function.

8. A mixture according to claim 7, in which polymer P6 containing at least one reactive function is selected from the group consisting of polyesters, liquid crystal polymers, polycarbonates, polyamides, polyacetals, polyvinyl alcohols, ethylene-polyvinyl alcohol copolymers, and copolymers of olefins and functionalised vinyl derivatives.

9. A mixture according to claim 7, in which polymer P6 containing at least one reactive function is selected from the group consisting of polyesters and polyamides.

10. A mixture according to claim 7, in which polymer P6 containing at least one reactive function is a polyester.

11. A composition according to claim 1, in which reactive group X is selected from the group consisting of a hydroxyl group, a carboxylic group, a carboxamide group, a carboxylic acid halide group, a thiol group, a thiocarboxylic group, an amino group, a halogen, an epoxy group, an esterified carboxylic group in which the ester portion comprises a reactive group, and group —R— is selected from the group consisting of aliphatic, saturated or unsaturated, substituted or non substituted hydrocarbon groups, and substituted or non substituted aromatic groups.

12. A composition according to claim 1, in which group —R— is a benzene residue and group —X is in the position meta or para to the nitrogen atom, and is a carboxylic group.

13. A thermoplastic polymer composition according to claim 1, characterized in that it is the product obtained by bringing a molten polyolefin into contact in a mixer or an extruder with at least one polymer containing at least one reactive function, and with at least one compound containing a maleimide ring substituted on the nitrogen by a reactive group and with at least one polyepoxide containing at least two epoxy groups in its molecule.

14. A thermoplastic polymer composition according to claim 13, wherein the polyolefin is formed from at least one unsaturated monomer is selected from the group consisting of ethylene, propene, butenes and norbornenes.

15. A thermoplastic polymer composition according to claim 13, in which the polyolefin is a high density polyethylene.

16. A thermoplastic polymer composition according to claim 1, in which the proportion of modified polyolefin P2 is about 0.01% to about 99% by weight.

17. A thermoplastic polymer composition according to claim 1, in which polymer P1 containing at least one reactive function is selected from the group consisting of polyesters, liquid crystal polymers, polycarbonates, polyamides, copolyamides, polyurethanes, polyacetals, polyvinyl alcohols, ethylene-vinyl alcohol copolymers, and copolymers of olefins and functionalised vinyl derivatives.

18. A thermoplastic polymer composition according to claim 1, in which polymer P1 containing at least one reactive function is selected from the group consisting of polyesters and polyamides.

19. A thermoplastic polymer composition according to claim 1, in which polymer P1 containing at least one reactive function is a polyester.

20. A thermoplastic polymer composition according to claim 1, characterized in that it is the product obtained by bringing a molten polyolefin in a step a) into contact with at least one compound containing a maleimide ring substituted on the nitrogen by a reactive group and with at least one polyepoxide containing at least two epoxy groups in its molecule in a mixer or an extruder to form a product P4, then in a step b) bringing the product P4 obtained from step a) into contact with at least one polymer containing a reactive function in a mixer or an extruder.

21. A thermoplastic polymer composition according to claim 20, in which product P4 is obtained by bringing a molten polyolefin into contact, in a step a 1), with at least one compound containing a maleimide ring substituted on the nitrogen by a reactive group in a mixer or an extruder then, in a step a2), bringing the product from step a1) into contact with at least one polyepoxide containing at least two epoxy groups in its molecule, in a mixer or an extruder.

22. A thermoplastic polymer composition according to claim 1, characterized in that it is the product obtained by bringing a molten polyolefin into contact in a mixer or an extruder with at least one polymer containing at least one reactive function, and with at least one compound containing a maleimide ring substituted on the nitrogen by a reactive group and with at least one polyepoxide containing at least two epoxy groups in its molecule.

23. A thermoplastic polymer composition according to claim 1, wherein said at least one polyepoxide is selected from the group consisting of the diglycidylether of bis-phenol-A or that of bis-phenol-F, triglycidylether isocyanurate, triglycidylether cyanurate, triglycidyl cyanurate, triglycidyl isocyanurate and mixtures thereof.

24. A thermoplastic polymer composition containing at least two distinct polymers, characterized in that it comprises at least one polymer P1 containing at least one reactive function and at least one modified polyolefin P2 containing at least one succinimide ring substituted on the nitrogen by a reactive group, said thermoplastic composition being the product obtained by bringing a molten polyolefin into contact in a mixer or an extruder with at least one polymer containing at least one reactive function, and with at least one compound containing a maleimide ring substituted on the nitrogen by a reactive group and with at least one polyepoxide containing at least two epoxy groups in its molecule.

25. A thermoplastic polymer composition containing at least two distinct polymers, characterized in that it comprises at least one polymer P1 containing at least one reactive function and at least one modified polyolefin P2 containing at least one succinimide ring substituted on the nitrogen by a reactive group, said thermoplastic polymer composition being obtained by bringing a molten polyolefin into contact, in a step a1), with at least one compound containing a maleimide ring substituted on the nitrogen by a reactive group in a mixer or an extruder then, in a step a2), bringing the product from step a1) into contact with at least one polyepoxide containing at least two epoxy groups in its molecule, in a mixer or an extruder, and contacting the resultant product with at least one polymer containing a reactive function in a mixer or an extruder.

* * * * *